United States Patent
Lehner et al.

(10) Patent No.: US 7,878,053 B2
(45) Date of Patent: Feb. 1, 2011

(54) ENGINE OFF BRAKE BOOSTER LEAK DIAGNOSTIC SYSTEMS AND METHODS

(75) Inventors: Chad W. Lehner, Howell, MI (US); William L. Aldrich, III, Davisburg, MI (US)

(73) Assignee: GM Global Technology Operations, Inc.

( * ) Notice: Subject to any disclaimer, the term of this patent is extended or adjusted under 35 U.S.C. 154(b) by 1075 days.

(21) Appl. No.: 11/645,354

(22) Filed: Dec. 22, 2006

(65) Prior Publication Data

US 2008/0154454 A1 Jun. 26, 2008

(51) Int. Cl.
G01M 17/00 (2006.01)
(52) U.S. Cl. .......................................... 73/121
(58) Field of Classification Search ................... 73/121, 73/128, 129
See application file for complete search history.

(56) References Cited

U.S. PATENT DOCUMENTS

| | | | |
|---|---|---|---|
| 6,347,608 B1 * | 2/2002 | Hara et al. ............... 123/179.4 |
| 6,443,535 B1 | 9/2002 | Crombez et al. |
| 6,557,403 B1 * | 5/2003 | Kerns ........................... 73/121 |
| 6,754,579 B2 * | 6/2004 | Kamiya et al. .............. 701/112 |
| 6,880,533 B2 * | 4/2005 | Kerns et al. ................. 123/494 |
| 7,076,347 B2 | 7/2006 | Lehner et al. |
| 7,188,517 B2 * | 3/2007 | Kerns et al. .................... 73/121 |
| 2003/0177822 A1 * | 9/2003 | Kerns ......................... 73/118.1 |
| 2005/0165522 A1 * | 7/2005 | Lehner et al. ................. 701/34 |
| 2009/0071147 A1 * | 3/2009 | Wang et al. ................. 60/547.1 |

FOREIGN PATENT DOCUMENTS

| | | |
|---|---|---|
| CN | 2041270 U | 7/1989 |
| DE | 4439904 | 5/1996 |
| DE | 19743959 | 4/1999 |

* cited by examiner

*Primary Examiner*—Eric S McCall

(57) ABSTRACT

A control system for evaluating a brake booster system is provided. The control system includes an engine evaluation module that detects an engine off condition. A pressure evaluation module monitors hydraulic brake line pressure and detects changes in brake booster pressure during the engine off condition. A fault reporting module selectively detects a brake booster fault based on the brake line pressure and the changes in brake booster pressure.

20 Claims, 3 Drawing Sheets

ENGINE OFF BRAKE BOOSTER LEAK DIAGNOSTIC SYSTEMS AND METHODS

FIELD

The present disclosure relates to brake booster systems for hybrid vehicles.

BACKGROUND

The statements in this section merely provide background information related to the present disclosure and may not constitute prior art.

As an alternative to the internal combustion engine, automotive manufacturers have developed hybrid powertrains that include both an electric traction machine and an internal combustion engine. During operation, vehicles including the hybrid powertrain use one or both of the power sources to improve efficiency.

Hybrid vehicles include either a parallel drivetrain configuration or a series drivetrain configuration. In the parallel hybrid vehicle, the electric machine works in parallel with the engine to combine the power and range advantages of the engine with the efficiency and the electrical regeneration capability of the electric machine. In the series hybrid vehicle, the engine drives a generator to produce electricity for the electric machine, which drives a transaxle. This allows the electric machine to assume some of the power responsibilities of the engine, thereby permitting the use of a smaller and more efficient engine. Additionally, for either described hybrid configuration, the engine may be turned off while the vehicle is stopped and the driver's foot remains on the brake pedal. This is done to conserve fuel—increasing the duration of engine stoppage while the vehicle is at rest increases the hybrid fuel economy benefit.

Some hybrid vehicles include a vacuum driven brake booster that reduces the brake pedal effort required to achieve a desired vehicle braking force. These hybrid vehicles use the engine's intake manifold as a source for the vacuum which is stored in the brake booster. When the engine is turned off for hybrid operation, a finite level of vacuum is held in the brake booster which is depleted as the brake pedal is modulated. Hybrid vehicles require sufficient brake booster vacuum levels during engine off operation to maintain brake assist. If brake booster vacuum falls below a threshold during engine off hybrid operation, the engine will start so that brake booster vacuum can be replenished. Normally brake booster vacuum is depleted via brake modulation, but a leaky brake booster system can also cause brake vacuum to fall below the engine start threshold preventing or shortening hybrid engine off operation. Since this failure mode results in an impact to emissions and fuel economy, the brake booster system should be diagnosed for leaks.

SUMMARY

Accordingly, a control system for evaluating a vacuum assisted brake booster system is provided. The control system includes an engine evaluation module that detects an engine off condition. A pressure evaluation module monitors hydraulic brake line pressure and detects changes in brake booster pressure during the engine off condition. A fault reporting module selectively detects a brake booster fault based on the brake line pressure and the changes in brake booster pressure.

In other features, a method of monitoring a brake booster system for leaks is provided. The method includes: detecting an engine off condition; during the engine off condition, monitoring brake line pressure and determining changes in brake booster pressure; and selectively detecting a brake booster fault based on the monitoring brake line pressure and the determining changes in brake booster pressure.

In still other features, a hybrid vehicle that includes an engine is provided. The hybrid vehicle includes a brake booster vacuum system in fluid communication with a vehicle braking system and in vacuum pressure communication with the engine and that provides braking assistance to the braking system of the hybrid vehicle. A first pressure sensor generates a brake line pressure signal based on a brake line pressure of the braking system. A second pressure sensor generates a brake booster pressure signal based on a brake booster pressure in the brake booster vacuum system. A control module detects a leak in the brake booster vacuum system based on the brake line pressure signal and the brake booster pressure signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
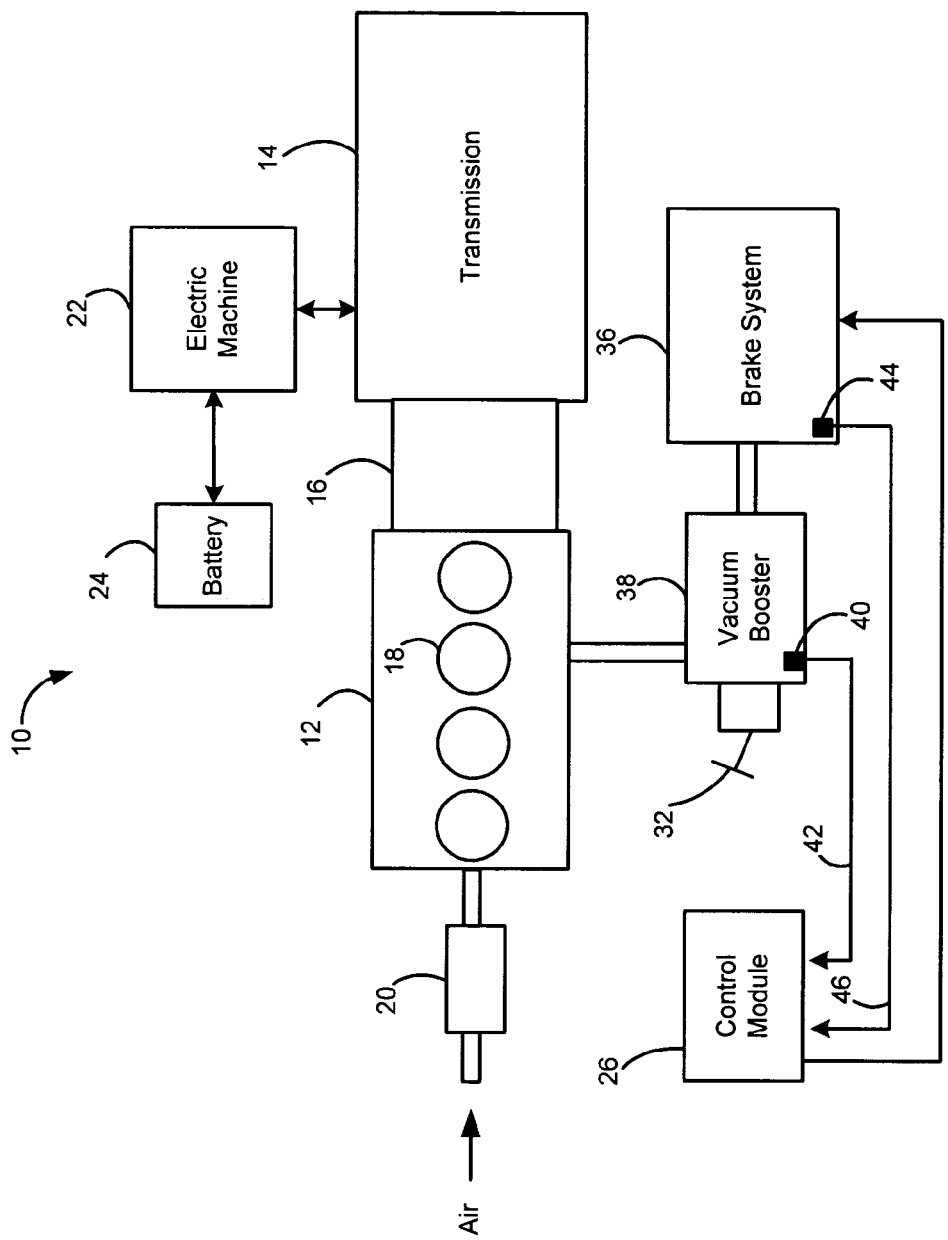
FIG. 1 is a block diagram illustrating a hybrid vehicle including a brake booster leak detection system according to various aspects of the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary hybrid vehicle 10 is shown. As can be appreciated, the brake booster leak detection methods and systems of the present disclosure can be used in various series and parallel hybrid vehicles. For exemplary purposes, the brake booster leak detection methods and systems of the present disclosure will be discussed in the context of a parallel hybrid vehicle. The vehicle 10 shown in FIG. 1 includes an engine 12 that drives a transmission 14. The transmission 14 can be either an automatic or a manual transmission that is driven by the engine 12 through a corresponding torque converter or clutch 16. The engine 12 includes N cylinders 18. Although FIG. 1 depicts four cylinders (N=4), it can be appreciated that the engine 12 may include additional or fewer cylinders 18. For example, engines having 4, 5, 6, 8, 10, 12 and 16 cylinders are contemplated. Air flows into the engine 12 through a throttle 20 and is combusted with fuel in the cylinders 18.

The vehicle 10 further includes an electric machine 22 and a battery 24. The electric machine 22 operates in one of a motor mode and a generator mode. When operating in the motor mode, the electric machine 22 is powered by the battery 24. When in motor mode, the electric machine 22 provides positive torque which assists the engine 12 or drives the transmission 14. When operating in the generator mode, the electric machine 22 generates electrical energy to charge the battery 24. The electric machine 22 may be driven by the engine 12 or by the transmission 14. As can be appreciated, the battery 24 can power other vehicle accessories in addition to the electric machine 22.

A vehicle operator manipulates a brake pedal 32 to regulate vehicle braking. More particularly, a braking system 36 adjusts vehicle braking based on a force applied to the brake pedal 32 to regulate vehicle speed. A vacuum assisted brake booster 38 receives negative pressure supplied by the manifold (not shown) of the engine 12. The vacuum assisted brake booster 38 uses the negative pressure as a vacuum to provide extra force to assist driver braking.

A first pressure sensor 40 generates a brake booster pressure signal 42 based on a pressure supplied to the vacuum assisted brake booster 38. A second pressure sensor 44 generates a brake line pressure signal 46 based on a line pressure in the braking system 36. The control module 26 receives the pressure signals 42 and 46 and detects leaks in the brake booster vacuum as will be discussed further below.

Figure 2:
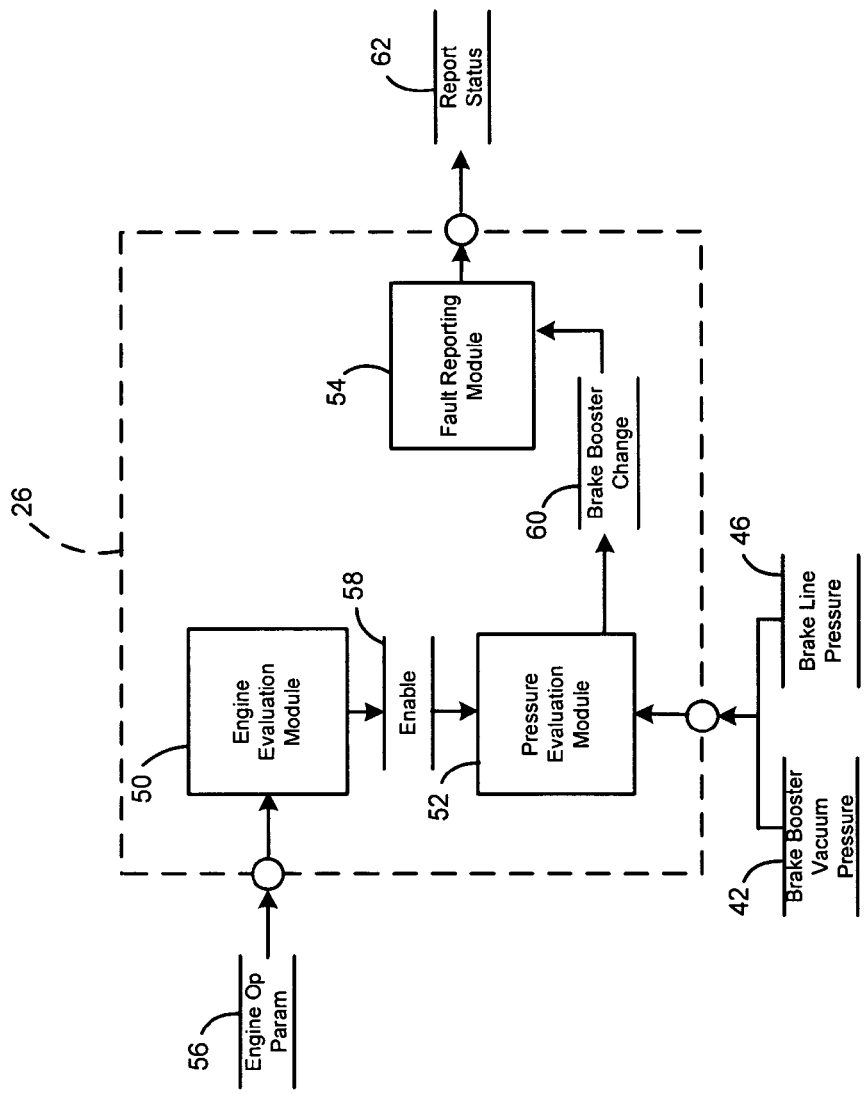
FIG. 2 is a dataflow diagram illustrating a brake booster leak detection system according to various aspects of the present disclosure.

Referring now to FIG. 2, a dataflow diagram illustrates various embodiments of a brake booster leak detection system that may be embedded within the control module 26. Various embodiments of brake booster leak detection systems according to the present disclosure may include any number of sub-modules embedded within the control module 26. As can be appreciated, the sub-modules shown may be combined and/or further partitioned to similarly detect a leak in the vacuum assisted brake booster 38. Inputs to the system may be sensed from the vehicle 10 (FIG. 1), received from other control modules (not shown) within the vehicle 10 (FIG. 1), and/or determined by other sub-modules (not shown) within the control module 26. In various embodiments, the control module 26 of FIG. 2 includes an engine evaluation module 50, a pressure evaluation module 52, and a fault reporting module 54.

The engine evaluation module 50 monitors engine evaluation parameters 56 to determine when the engine 12 (FIG. 1) is off or the vehicle 10 (FIG. 1) is off but the control module 26 (FIG. 1) is still powered (i.e. extended engine off power mode). If one or more of the engine off conditions are met, the engine evaluation module 50 sets a diagnostic enable flag 58 to TRUE. Otherwise, the diagnostic enable flag 58 remains set to FALSE. The pressure evaluation module 52 begins evaluating the pressure signals 42 and 46 once the diagnostic enable flag 58 is TRUE. More specifically, the pressure evaluation module 52 monitors brake line pressure 46 for a predetermined time. If the brake line pressure 46 remains substantially constant for that predetermined time, the pressure evaluation module determines a change in brake booster vacuum pressure 60 over that predetermined amount of time.

The fault reporting module 54 evaluates the change in brake booster vacuum pressure 60 to determine if a leak is present. If the change in brake booster vacuum pressure 60 indicates a vacuum decay has occurred, a report status 62 is set that indicates a leak is present or the test has failed. Otherwise, if the change in brake booster vacuum pressure 60 indicates no decay or not enough decay (i.e. based on a predetermined decay threshold) has occurred, the report status 62 is set to indicate a leak is not present or the test has passed. In various embodiments, the fault reporting module 54 applies a statistical filter such as an Exponential Weighted Moving Average (EWMA) to the change in brake booster vacuum pressure 60. The fault reporting module 54 then evaluates a result of the statistical filter to determine whether a leak is present.

Figure 3:
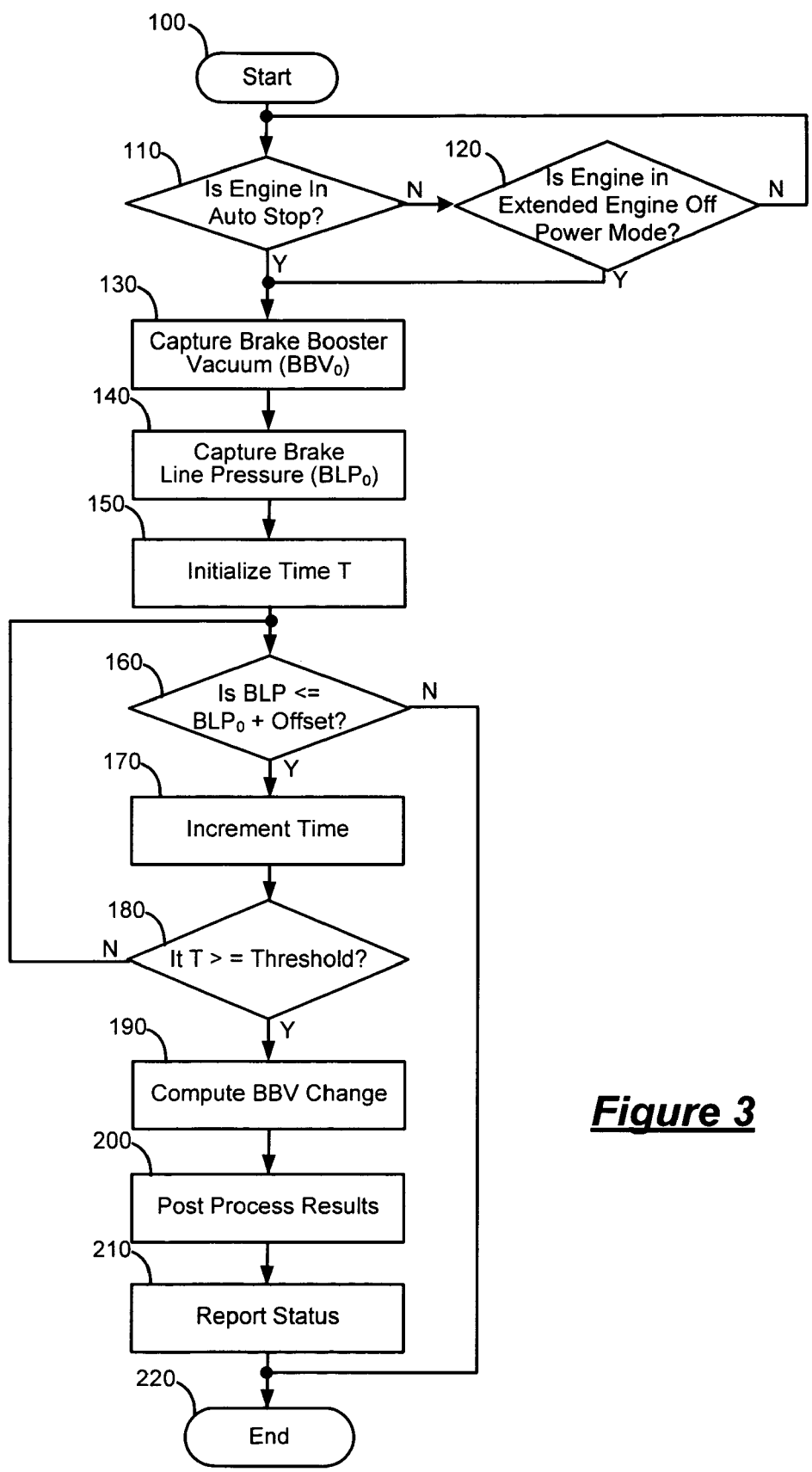
FIG. 3 is a flowchart illustrating a brake booster leak detection method according to various aspects of the present disclosure.

Referring now to FIG. 3, a flowchart illustrates a brake booster leak detection method that can be performed by the control module 26 of FIG. 2 according to various aspects of the present disclosure. As can be appreciated, the order of execution of the steps of the brake booster leak detection method can vary without altering the spirit of the method. The method may be performed periodically during control module operation or scheduled to run based on certain events. The method may begin at 100. Engine evaluation parameters are monitored at 110 and 120. If the engine is stopped at 110 or the engine is in an extended engine off power mode at 120, an initial brake booster vacuum pressure ($BBV_0$) is captured at 130. An initial brake line pressure ($BLP_0$) is captured at 140 and a time parameter (T) is initialized to zero at 150. Otherwise, if the engine is not stopped and the engine is not operating in an extended engine off power mode, engine evaluation parameters are continually monitored at 110 and 120.

Once the initial brake line pressure ($BLP_0$) and the initial brake booster vacuum pressure ($BBV_0$) are captured at 130 and 140 and the time (T) is initialized at 150, the current brake line pressure (BLP) is evaluated at 160. If the current brake line pressure (BLP) is less than or equal to the initial brake line pressure ($BLP_0$) plus a predetermined offset, the time (T) is incremented at 170. Otherwise, if the current brake line pressure (BLP) is greater than the initial brake line pressure ($BLP_0$) plus the predetermined offset, the method may end at 220.

At 180, if the time (T) is greater than or equal to a predetermined time threshold, a change in brake booster vacuum pressure is computed at 190. The change in brake booster vacuum pressure can be computed as a ratio (R) based the initial brake booster vacuum pressure ($BBV_0$) and a current brake booster vacuum pressure (BBV) and based on the following equation:

$$R=(BBV_0-BBV)/BBV_0. \qquad (1)$$

The brake booster vacuum ratio (R) is then processed at 200 to determine if a leak is present. For example, a statistical filter such as EWMA is applied to the ratio (R). If the result of the statistical filter is zero or below a predetermined threshold, a leak is not present and the test has passed. If the result of the statistical filter is greater than a predetermined threshold, a leak is present and the test has failed. The status of the leak is reported at 210. If a leak is detected, the report status 62 (FIG. 2) indicates Test Fail. If a leak is not detected, the report status 62 (FIG. 2) indicates Test Pass. The method may end at 220.

As can be appreciated, once the report status 62 (FIG. 2) is set to Test Fail, additional steps can be performed to notify other systems and users of the failure. In various embodiments, a diagnostic code is set based on the report status 62 (FIG. 2). The diagnostic code can be retrieved by a service tool or transmitted to a remote location via a telematics system. In various other embodiments, an indicator lamp is illuminated based on the report status 62 (FIG. 2). In various other embodiments, an audio warning signal is generated based on the report status 62 (FIG. 2).

As can be appreciated, all comparisons discussed above can be implemented in various forms depending on the selected values for comparison. For example, a comparison of "greater than or equal to" may be implemented as "greater than" in various embodiments. Similarly, a comparison of "less than or equal to" may be implemented as "less than" in various embodiments Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A control system for evaluating a brake booster system, comprising:
    an engine evaluation module that detects an engine off condition;
    a pressure evaluation module that, during the engine off condition, monitors hydraulic brake line pressure and detects changes in brake booster pressure; and
    a fault reporting module that selectively detects a brake booster fault based on the brake line pressure and the changes in brake booster pressure.

2. The system of claim 1 wherein the pressure evaluation module determines the changes in brake booster pressure during the engine off condition and when the brake line pressure remains substantially constant.

3. The system of claim 2 wherein the fault reporting module detects the brake booster fault when the changes in brake booster pressure exceed a predetermined threshold.

4. The system of claim 2 wherein the fault reporting module generates a report status indicating a Test Pass when the changes in brake booster pressure are below a predetermined threshold.

5. The system of claim 1 wherein the fault reporting module applies a statistical filter to the changes in brake booster pressure and selectively detects the brake booster fault based on a result of the statistical filter.

6. The system of claim 5 wherein the statistical filter is based on an exponentially weighted moving average.

7. The system of claim 1 wherein the engine evaluation module detects the engine off condition when an engine off parameter indicates an engine auto stop mode.

8. The system of claim 1 wherein the engine evaluation module detects the engine off condition when an engine off parameter indicates an extended engine off power mode.

9. A method of monitoring a brake booster system for leaks, comprising:
    detecting an engine off condition;
    during the engine off condition, monitoring brake line pressure and determining changes in brake booster pressure; and
    selectively detecting a brake booster fault based on the monitoring brake line pressure and the determining the changes in brake booster pressure.

10. The method of claim 9 wherein the selectively detecting the changes in brake booster pressure occurs during the engine off condition and when the brake line pressure remains substantially constant.

11. The method of claim 10 wherein the selectively detecting the brake booster fault comprises selectively detecting the brake booster fault when the changes in brake booster pressure exceed a predetermined threshold.

12. The method of claim 11 further comprising generating a report status indicating a Test Fail when the changes in brake booster pressure exceed the predetermined threshold.

13. The method of claim 11 further comprising generating a report status indicating a Test Pass when the changes in brake booster pressure is below the predetermined threshold.

14. The method of claim 9 further comprising applying a statistical filter to the changes in brake booster pressure and selectively detecting the brake booster fault based on a result of the statistical filter.

15. The method of claim 9 wherein the detecting the engine off condition comprises detecting the engine off condition based on an engine parameter indicating an engine auto stop mode.

16. The method of claim 9 wherein the detecting the engine off condition comprises detecting the engine off condition based on an engine parameter indicating an extended engine off power mode.

17. A hybrid vehicle that includes an engine, comprising:
    a brake booster vacuum system in fluid communication with a vehicle braking system and in vacuum pressure communication with the engine and that provides braking assistance to the braking system of the hybrid vehicle;
    a first pressure sensor that generates a brake line pressure signal based on a brake line pressure of the braking system;
    a second pressure sensor that generates a brake booster pressure signal based on a brake booster pressure in the brake booster vacuum system; and
    a control module that detects a leak in the brake booster vacuum system based on the brake line pressure signal and the brake booster pressure signal.

18. The hybrid vehicle of claim 17 wherein the control module detects a leak in the brake booster vacuum system when the brake line pressure signal indicates substantially constant brake line pressure and the brake booster pressure signal indicates a change in brake booster pressure.

19. The hybrid vehicle of claim 18 wherein the control module detects an engine off condition and wherein the control module detects the leak in brake booster vacuum system during the engine off condition.

20. The vehicle of claim 17 wherein the control module applies a statistical filter to the change in brake booster pressure and wherein the leak is detected based on a result of the statistical filter.

* * * * *